US006189090B1

(12) United States Patent
Tan et al.

(10) Patent No.: US 6,189,090 B1
(45) Date of Patent: Feb. 13, 2001

(54) DIGITAL SIGNAL PROCESSOR WITH VARIABLE WIDTH INSTRUCTIONS

(75) Inventors: Yew-Koon Tan, San Jose; Shuichi Maeda, Sunnyvale, both of CA (US)

(73) Assignees: Sony Corporation, Tokyo (JP); Sony Electronics Inc., Park Ridge, NJ (US)

(*) Notice: Under 35 U.S.C. 154(b), the term of this patent shall be extended for 0 days.

(21) Appl. No.: 09/094,193

(22) Filed: Jun. 9, 1998

Related U.S. Application Data (60) Provisional application No. 60/059,196, filed on Sep. 17, 1997.

(51) Int. Cl.[7] .................................................. G06F 9/40
(52) U.S. Cl. ........................ 712/229; 712/24; 712/43; 712/204
(58) Field of Search .............................. 712/210, 33, 24, 712/209, 229, 43; 711/212; 709/208

(56) References Cited

U.S. PATENT DOCUMENTS

| | | | |
|---|---|---|---|
| Re. 34,850 | * 2/1995 | Murakami et al. | 712/33 |
| 4,467,447 | * 8/1984 | Takahashi et al. | 712/200 |
| 4,523,276 | * 6/1985 | Maejima et al. | 712/210 |
| 4,716,527 | * 12/1987 | Graciotti | 712/212 |
| 5,479,626 | * 12/1995 | Bindloss et al. | 711/212 |
| 5,485,629 | * 1/1996 | Dulong | 712/24 |
| 5,511,174 | 4/1996 | Hicok et al. | 711/201 |
| 5,652,852 | 7/1997 | Yokota | 712/208 |
| 5,787,303 | * 7/1998 | Ishikawa | 712/24 |
| 5,881,259 | * 3/1999 | Glass et al. | 712/210 |
| 5,978,822 | * 11/1999 | Muwafi et al. | 708/209 |
| 6,003,125 | * 12/1999 | Shippy | 712/210 |
| 6,014,735 | * 1/2000 | Chennupaty et al. | 712/210 |
| 6,026,486 | * 2/2000 | Kodama et al. | 712/229 |

FOREIGN PATENT DOCUMENTS

WO97/48041   12/1997   (WO) .............................. G06F/9/318

OTHER PUBLICATIONS

Segars et al., Embedded Control Problems, Thumb, and the ARM7TDMI, IEEE Micro, Oct. 15, 1995, No. 5, pp. 22–30.
Goudge et al., Thumb: Reducing the Cost of 32–bit RISC Performance in Portable and Consumer Applications, IEEE, Feb. 25, 1996, pp. 176–181.

* cited by examiner

Primary Examiner—Meng-Ai T. An
Assistant Examiner—Jungwon Chang
(74) Attorney, Agent, or Firm—Wood,Herron&Evans, L.L.P.

(57) ABSTRACT

A digital signal processor which supports an instruction set including both 16-bit instructions and 32-bit instructions, so that particular portions of a program requiring only 16-bit instructions may be encoded in a 16-bit mode, thus reducing the program memory needed to store these portions. The digital signal processor switches between the 16- and 32-bit modes only in response to flow control instructions such as JUMP, CALL or RETURN instructions. JUMP and CALL instructions are coded to indicate the processor mode applicable to the instructions to which the JUMP or CALL instruction goes to, so that the processor may change modes as needed when executing the JUMP or CALL instruction. When a CALL is executed the current processor mode is stored on the processor's stack, so that in response to a RETURN instruction the processor can return to this mode by retrieving the stored mode from the stack.

35 Claims, 7 Drawing Sheets

```
100 ─ PSECT 16  "SECTION 1"
        <16-BIT INSTRUCTION>
              ⋮
LABEL 0:  < 16-BIT INSTR. A >
          CALL (LABEL1)
          < 16-BIT INSTR. B >
          < 16-BIT INSTR. C >
          JUMP (LABEL 0)
```

FIG. 4A

```
100 ─ PSECT 16  "SECTION 2"
LABEL 1:  < 16-BIT INSTR. D >
          < 32-BIT INSTR. E >
          < 16-BIT INSTR. F >
          < 32-BIT INSTR. G >
          CALL (LABEL 2)
          < 16-BIT INSTR. H >
          < 16-BIT INSTR. I >
          RETURN
```

FIG. 4B

```
98 ─ PSECT 32  "SECTION 3"
LABEL 2:  < 32-BIT INSTR. J >
          < 32-BIT INSTR. K >
          < 32-BIT INSTR. L >
          < 16-BIT INSTR. M >
          < 16-BIT INSTR. N >
          RETURN
```

FIG. 4C

| SECTION | TYPE |
|---|---|
| "SECTION 1" | 16 |
| "SECTION 2" | 16 |
| "SECTION 3" | 32 |
| ⋮ | ⋮ |

FIG. 5A

| LABEL | SECTION | TYPE | RELATIVE ADDR. |
|---|---|---|---|
| LABEL 0 | "SECTION 1" | 16 | - |
| LABEL 1 | "SECTION 2" | 16 | 00f9 |
| LABEL 2 | "SECTION 3" | 32 | 0106 |

DIGITAL SIGNAL PROCESSOR WITH VARIABLE WIDTH INSTRUCTIONS

This application claims the benefit of U.S. provision No. 60/059,196 filed Sep. 17, 1997.

FIELD OF THE INVENTION

The present invention relates to digital signal processing and particularly to processing circuits for processing digital signals.

BACKGROUND OF THE INVENTION

A typical general purpose digital signal processor (DSP) includes a controller which decodes instructions, by controlling operations of a high speed data path, registers, and a memory address generator. Individual instructions are fetched to the controller, typically at the rate of one instruction per clock cycle (or slower), and the controller decodes each instruction and sends control signals to the data path, registers, and memory address generator to perform the actions required by the instruction. Through programmed combinations of instructions, any variety of data processing operations can be accomplished.

Each DSP (or other microprocessor) is associated with a finite, well-defined set of equal-length instructions, which instructions are arranged into programs to operate the DSP. The number and length of the instructions, and the operations they perform, varies from one DSP to another based on the functions desired. For example, some DSPs support a relatively large set of relatively long (e.g., 32-bit) instructions allowing the choice of many different functions; other DSPs support only a small set of relatively short (e.g., 16-bit) instructions providing a choice of fewer functions. Instruction size and complexity are proportional. Larger instructions can identify functions with more specificity than smaller instructions, thus allowing more complex functions to be completed within each instruction cycle. Larger instructions, however, require more memory space to store. Since all instructions are the same size, increasing the size of one instruction causes a proportionate increase in the size of every other instruction, and thus a proportionate increase in the size of all programs for the DSP, even if only a small fraction (or none) of the instructions in a given program make use of the complex operations which necessitated the increased instruction size.

SUMMARY OF THE INVENTION

In accordance with principles of the present invention, a DSP supports an instruction set including both 16-bit instructions and 32-bit instructions, so that particular portions of a program requiring only 16-bit instructions may be encoded in a 16-bit mode, thus reducing the program memory needed to store these portions.

In particular embodiments of this aspect, the DSP switches between the 16- and 32-bit modes only in response to flow control instructions such as JUMP, CALL or RETURN instructions. These instructions require flushing the instruction pipelines in the DSP, and thus are useful times to switch instruction modes. JUMP and CALL instructions are coded to indicate the processor mode applicable to the instructions to which the JUMP or CALL instruction goes to, so that the processor may change modes as needed when executing the JUMP or CALL instruction. When a CALL is executed the current processor mode is stored on the processor's stack, so that in response to a RETURN instruction the processor can return to this mode by retrieving the stored mode from the stack.

Further aspects of the present invention include the method of controlling operations of the DSP in response to short and long instructions, and a method of assembling a source program of code lines into modules of short and long instructions, and linking the modules into an object program.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
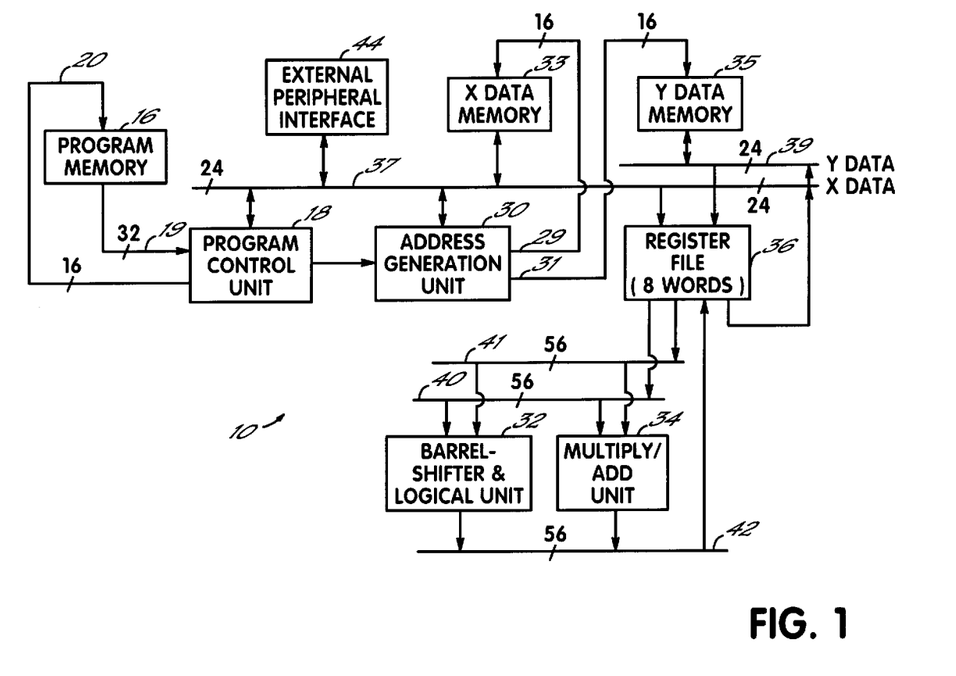
FIG. 1 is a schematic block diagram of a DSP in accordance with principles of the present invention.

Referring to FIG. 1, a digital signal processor 10 in accordance with the principles of the present invention includes various functional units which support instructions that can be executed by the processor. Processor 10 responds to a program of instructions stored in program memory 16.

Processor 10 includes a program control unit 18 which fetches instructions from program memory 16 through a bus 19, and then decodes these instructions, causing other functional units in processor 10 to perform the instructed operations. Program control unit 18 fetches instructions from program memory 16 by delivering an address over bus 20 to program memory 16. Program control unit 18 may fetch sequential instructions in program memory 16, or may decode and execute various JUMP or CALL commands to sequence from one section of program memory 16 to another section under control of instructions in program memory 16.

In response to each instruction fetched by program control unit 18, control unit 18 produces control signals which are delivered to other functional units of processor 10 causing those functional units to perform the instructed operations.

The functional units in processor 10 include an address generation unit 30 for responding to control signals and/or data from a X-data bus 37, and generating memory addresses on busses 29 and 31. The memory addresses on busses 29 and 31 are delivered to X and Y data memories 33 and 35. The output of X data memory 33 is delivered to bus 37 and the output of Y data memory 35 is delivered to bus 39.

Processor 10 includes a barrel shift and logical unit 32, which performs logical operations such as AND, OR and exclusive OR (XOR) as well performing shift operations on binary data. In addition to barrel shift and logical unit 32, processor 10 includes a multiply/add unit 34 which performs multiplication and addition operations on binary values received therein.

Units 32 and 34 respond to data found in registers of a register file 36. General purpose registers in register file 36 can be accessed by units 32 and 34 to perform computations as instructed by instructions received at program control unit 18. The contents of registers in register file 36 can be retrieved via busses 40 or 41 by units 32 or 34. The outputs of units 32 and 34 delivered to a bus 42, and can be stored into registers in register file 36 from bus 42.

Data from register file 36 can also be delivered to busses 37 or 39, to permit storage of data in data memories 33 and 35, or output of data to other areas via peripheral interface 44.

Figure 2:
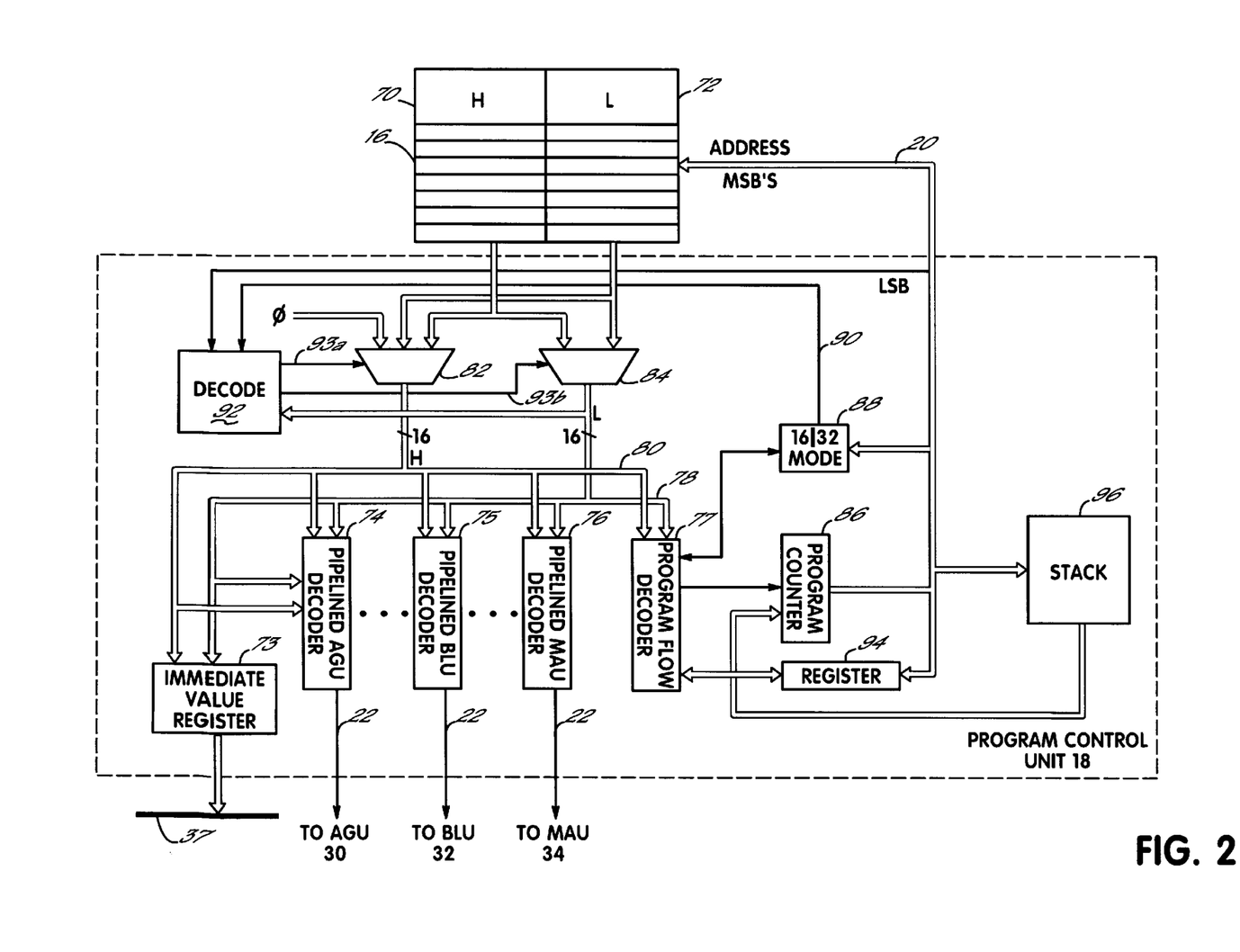
FIG. 2 is a schematic block diagram of the program memory and program control unit of the DSP of FIG. 1, showing the use of 16- or 32-bit wide instruction memory.

Referring now to FIG. 2, the specific details of the interaction of program memory 16 and program control unit 18 can be elaborated. As illustrated in FIG. 2, program memory 16 is a 32-bit wide memory which is partitioned into a first 16-bit wide more significant segment 70 and a second 16-bit wide less significant segment 72. As will be seen in detail below, instructions stored in program memory 16 may be either 16-bits wide or 32-bits wide. Sixteen-bit instructions are stored in alternating segments 70 and 72. Thirty two-bit wide instructions are stored in pairs of 16-bit memory locations spanning segments 70 and 72.

As seen in FIG. 2, program control unit 18 includes various decoders 73–77 which decode instructions fetched from program memory 16 to generate control signals on control lines 22 as well as control internal operations of program control unit 18. Specifically, an immediate value register 73 decodes immediate values from instructions and delivers these values to bus 37 for storage in registers of register file 36. Decoder 74 decodes instructions directed to the address generator unit (AGU) 30 and delivers corresponding control signals to the AGU 30. Decoder 75 decodes instructions directed to the barrel shift/logic unit (BLU) 32 and delivers corresponding control signals to the BLU 32. Decoder 76 decodes instructions directed to the multiply/add unit (MAU) 34 and delivers corresponding control signals to the MAU 34. Decoder 77 decodes instructions dealing with program flow (JUMP, CALL, etc.), and delivers control signals to other components of the program control unit 18.

It will be appreciated that the division of decoding tasks among various decoders 73–77, facilitates modifying any one of the decoders to change the operations it performs in response to a particular instruction, without altering the operations taken by other decoders in response to other instructions. This aspect of the present invention facilitates modification of processor 10 should such become necessary. Furthermore, in accordance with principles of the present invention, decoders 73–77 determine whether to decode to a particular instruction from the least significant bits of the opcode for the instruction. If the least significant bits of the opcode for an instruction do not match with those assigned to a particular decoder, the decoder will ignore the instruction. This not only allows the instructions to be directly associated with the decoders they activate, but further conserves power by limiting power-consuming digital switching to those decoders which must be active to decode a particular instruction.

Decoders 73–77 are pipelined, that is, instructions input to the decoders are stored in instruction pipelines in the decoders, and delivered a number of clock cycles later at the decoder outputs. This pipelining allows for more rapid decoding and execution of instructions.

Each decoder 73–77 has a pair of inputs, a first input connected to a bus 78 for receiving 16 less significant bits of an instruction, and a second input connected to a bus 80 for receiving 16 more significant bits of an instruction. Instructions are delivered to decoders 73–77 via busses 78 and 80 by a multiplexing circuit comprising first and second multiplexers 82 and 84. Multiplexers 82 and 84 operate differently based on whether 16-bit instructions are being read from alternate segment 70 and 72 of program memory 16, or alternatively, 32-bit instructions are being read from pairs of locations in segment 70 and 72 of program memory 16.

Multiplexer 84 is a 16-bit multiplexer, the output of which is connected (via a latch) to the less-significant inputs of decoders 73–77 via bus 78. Multiplexer 84 has a first input connected to the output from the less significant segment 72 of program memory 16. Multiplexer 84 has a second input connected to the more significant segment 70 of program memory 16.

Multiplexer 82 is a 16-bit multiplexer, the output of which is connected (via a latch) to the more significant inputs of decoders 73–77 via bus 80. Multiplexer 82 has a first input connected to the more significant segment 70 of program memory 16, a second input which is connected to the less significant segment 72 of program memory 16, and a third input which is hard wired to a zero value.

Program flow decoder 77 fetches instructions by instructing a program counter register 86 to produce an appropriate address on bus 20 for delivery to program memory 16. Program counter register produces an address on bus 20, identifying two corresponding locations in the high and low segments 70 and 72 of program memory 16 from which a current instruction is to be retrieved.

The address produced by program counter register 86 is divided into a single least significant bit (LSB) and the remaining more significant bits. The more significant bits of the address are delivered to program memory 16 to address two corresponding locations in the high and low segments 70 and 72 of program memory 16. The least significant bit is used internally in control of multiplexers 82 and 84, as described below.

Program flow decoder 77 is also connected to a 16/32 bit mode register 88, which produces a one-bit value on line 90 indicative of whether program control unit 18 is in a 16- or a 32-bit operating mode. When program control unit 18 is in a 16-bit mode, it receives and decodes 16-bit or 32-bit instructions; when program control unit 18 is in a 32-bit mode it receives and decodes only 32-bit instructions.

Program control unit 18 includes decode unit 92, which is responsible for controlling the operations of multiplexers 82 and 84 as appropriate for decoding a current instruction, by delivering control signals to multiplexers 82 and 84 over control lines 93a and 93b. Decode unit 92 is responsive to the LSB from the program counter 86, the output of 16/32 mode register 88, and the contents of bus 78, to appropriately control multiplexers 82 and 84.

The logic circuitry in decode unit 92 interacts with the program flow decoder 77 to sequence through a stored program of instructions in the following manner:

In a 16-bit mode, the instructions read from program memory 16 may be 16 or 32 bits long. Furthermore, 16-bit instructions may be found in either the high or low segments 72 and 70 of program memory 16. Also, the more and less significant halves of 32-bit instructions may be found in either segment of program memory 16. Accordingly, when program control unit 18 is in 16-bit mode, (as indicated by the contents of 16/32 mode register), decode unit 92 will initially cause multiplexer 84 to select and output onto bus 78, a 16-bit word from either the low or high segment 72 and 70 of program memory 16. Decode logic will cause a 16-bit word to be read from the low segment 72 if the LSB of the current program memory address on bus 20 has a "0" value. Decode logic will cause a 16-bit word to be read from the high segment 70 if the LSB of the current program memory address on bus 20 has a "1" value. At the same time, decode logic 92 causes multiplexer 82 to output a zero value (all 16-bits equal to "0") onto bus 80.

When a 16-bit word is output by multiplexer 84 on bus 78, the 16-bit word is evaluated by decoders 73–77 and by decode logic 92 to determine whether the 16-bit word is a complete 16-bit instruction, or alternatively is the low-order half of a 32-bit instruction. If the 16-bit word is a complete 16-bit instruction, the 16-bit instruction will be decoded by each of the decoders 73–77 and produce the desired operation. As part of this decoding, program flow decoder 77 will cause program counter 86 to increment the program memory address output on bus 20 by one, causing the immediately next instruction to be fetched. This will cause the LSB and potentially other bits of the address on bus 20 to transition. This transition, combined with recognition of a complete 16-bit instruction on bus 78, causes decode logic 92 to fetch a new 16-bit word via multiplexer 84 onto bus 78, in the manner described above.

If, alternatively, decoders 73–77 determine that the 16-bit word output by multiplexer 84 on bus 78 is the low-order half of a 32-bit instruction, decoders 73–76 will detect the resulting condition—low-order half of a 32-bit instruction on bus 78, and a zero value on bus 80, and determine that a 32-bit instruction has not yet been completely fetched. Accordingly, decoders 73–76 will ignore the instruction, while decoder 77 will cause program counter register 86 to increment its output address. This will cause the LSB and potentially other bits of the address on bus 20 to transition. This transition, combined with recognition of an incomplete 32-bit instruction on bus 78, causes decode logic 92 to instruct multiplexer 82 to fetch and store the high-order half of the 32-bit instruction. If the LSB has transitioned to a value of "1", the high-order half will be fetched by multiplexer 82 from segment 70 of program memory 16. If the LSB has transitioned to a value of "0", the high-order half will be fetched by multiplexer 82 from segment 72 of program memory 16.

As a result of these steps, after the above-described two address cycles, the complete 32-bit instruction will be delivered to and decoded by each of the decoders 73–77 and produce the desired operation. As part of this decoding, program flow decoder causes program counter 86 to increment the program memory address output on bus 20 by one, causing the immediately next instruction to be fetched.

In 32-bit mode, all instructions read from program memory 16 are 32-bits long. Furthermore, as described below all instructions are aligned such that the more significant 16-bit word of the instruction is the high segment 70 of program memory 16, and the less significant 16-bit word of the instruction is in the low segment 72 of program memory 16. Accordingly, multiplexers 82 and 84 may parallel fetch the low and high order halves of the 32-bit instructions from program memory 16. Thus, the operations of multiplexers 82 and 84 are less complex. Specifically, when program control unit 18 is in 32-bit mode (as indicated by the output of 16/32 mode register 88), decode logic 92 always instructs multiplexer 82 to output a 16-bit word obtained from high segment 70, and always instructs multiplexer 84 to output a 16-bit word obtained from low segment 72. Furthermore, in 32-bit mode, program flow decoder 77 always causes program counter 86 to increment the program memory address output on bus 20 by two, causing the immediately next 32-bit instruction to be parallel fetched.

Thus, through the interaction of multiplexers 82 and 84 with the mode signal on line 90, and the least significant bit of the signals on address bus 20, program control unit 18 will fetch alternating locations from segments 70 and 72 of program memory 16 when operating in a 16-bit mode, but will fetch two 16-bit locations in parallel from segments 70 and 72 of program memory 16 when operating in a 32-bit mode.

It will be appreciated from the foregoing that program memory 16 is addressed in 32-bit wide entries, using all but the least significant bit on address bus 20. Accordingly, program flow decoder 77, when in 16-bit mode, will increment program counter register 86 by one binary value for each instruction (or half-instruction) received. However, when in 32-bit mode, decoder 77 will increment program counter register 86 by two binary values for each instruction received.

FIG. 2 also illustrates various additional registers 94 which may be used by program control unit 18 to store temporary information needed as part of responding to instructions found in program memory 16. Furthermore, FIG. 2 illustrates a stack memory 96 which may be used by program control unit 18 to store and later retrieve the contents of registers 94, program counter register 86 and 16-bit/32-bit mode register 88. The inclusion of stack 96 permits program control unit 18 to branch from one location in the program in program memory 16 to other locations and to return to a previous point of execution after such a branch.

Figure 3A:
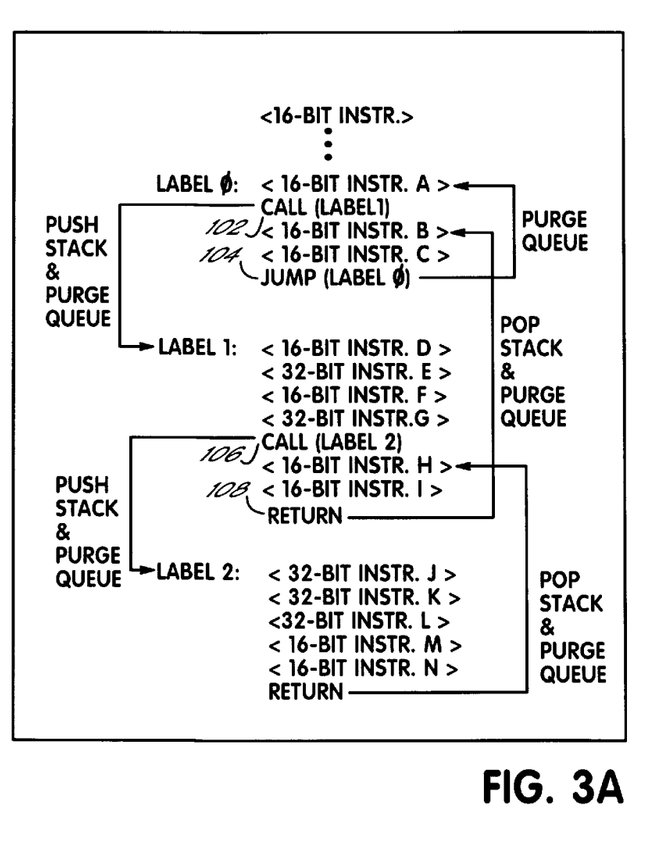
FIG. 3A illustrates an assembly-code program including 16- and 32-bit assembly language instructions.

To illustrate the functionality of program control unit 18, reference may be made to the exemplary program illustrated in FIG. 3A. The program listing in FIG. 3A is in pseudo assembly code format permitting illustration of the use of 16 and 32-bit instructions, and the manner in which call and jump instructions are implemented.

As seen in FIG. 3A, the assembly language for program control unit 18 include sections which use 16 or 32-bit instructions. Sections of an assembly language program are stored separately for assembly, along with an indication of whether those sections are to be executed in 16- or 32-bit mode. Each section begins with a PSECT16 or a PSECT32 command to indicate whether that section is to be executed in 16- or 32-bit mode. Specifically, sections of assembly language to be executed in 16-bit mode are preceded by a PSECT16 command such as shown at 100 in FIG. 4A. Sections of the assembly language are to be executed in 32-bit mode are preceded by a PSECT32 command such as shown at 98 in FIG. 4C. The use of PSECT16 and PSECT32 commands in the assembly language for program control unit 18 allows the assembler to appropriately assemble commands into 16-bit wide instructions or alternatively 32-bit wide instructions as appropriate for particular sections of the program.

The programmer writing assembly language for program control unit 18 may decide whether to use 32-bit mode or 16-bit mode in any particular routine of the program. The 32-bit mode permits greater speed in using high functionality 32-bit instructions, but at the expense of the increased program memory consumption. The programmer may decide how to trade off memory consumption with speed and functionality for any given program. In many instances, a programmer may choose to write a few time critical and frequently repeated subroutines of the program using 32-bit mode, while writing the remainder of the program in 16-bit mode for space savings. The program illustrated in FIG. 3A is written in accordance with these general philosophies.

Figure 4A:
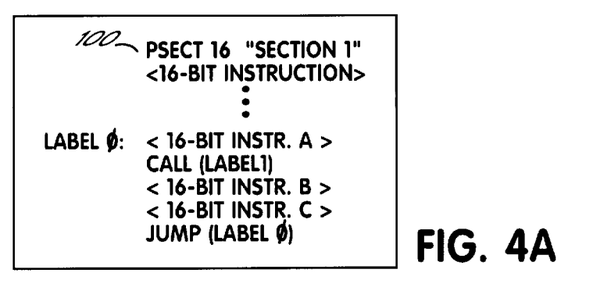
FIG. 4A is an illustration of a first section of the program of FIG. 3A.

Specifically, the program illustrated in FIG. 3A begins with a 16-bit section of the program (which is individually illustrated in FIG. 4A). In this section, there is a sequence of 16-bit instructions, including a 16-bit instruction A which is associated with an assembly language label, specifically, label 0. Following instruction A, is a CALL instruction 102 which causes the program execution to sequence to label 1. After the CALL instruction are two 16-bit instructions B and C followed by JUMP instruction 104 which causes program execution to jump to label 0.

The aforementioned label 1 is in a second section of the program (which is individually illustrated in FIG. 4B), associated with a 16-bit instruction D which is followed by a 32-bit instruction E, a 16-bit instruction F, and a 32-bit instruction G. At this point, a second CALL command 106 causes program execution to jump to a second assembly language label, label 2. After this CALL is a further 16-bit instruction H and a 16-bit instruction I. A return instruction 108 causes program execution to return to 16-bit instruction B which is the first instruction following CALL instruction 102.

Figure 4B:
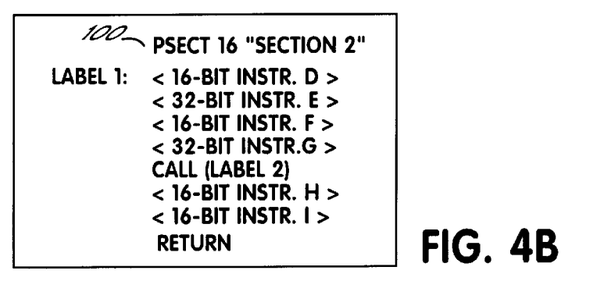
FIG. 4B is an illustration of a second section of the program of FIG. 3A.
Figure 4C:
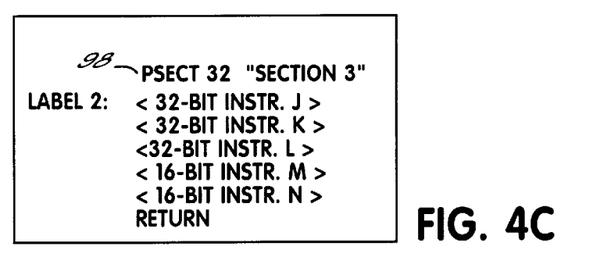
FIG. 4C is an illustration of a third section of the program of FIG. 3A.

Label 2 of the program illustrated in FIG. 3A begins a third section coded in 32-bit mode (which is individually illustrated in FIG. 4C). This section of instructions includes 32-bit instructions J, K, L, and 16-bit instructions M and N.

It will be appreciated that each of the CALL commands 102 and 106 included in the program cause program control unit 18 to store its current address location, register values and current mode (16 or 32-bit) into stack 96 (FIG. 2). Furthermore, it will be appreciated that return commands in the program such as 108 and 112, which cause program control unit 18 to return from a previous call, also cause program control unit 18 to pop from the stack 96 values for the program counter register 86 and mode select register 88. Thus, program control unit 18 is able to resume processing after a call by retrieving from the stack all values associated with the state of the processor before the call. Additionally, it will be appreciated that whenever a JUMP or CALL is executed by program control unit 18, the previously fetched instructions in the instruction pipelines of decoders 73–77 must be purged to allow execution to continue at the new location in the program to which program control unit 18 has sequenced. Accordingly, as a result of each CALL operation such as 102 and 106, or each JUMP operation such as 104, or as a result of each return operation such as 108 and 112, the instruction pipelines in decoders 73–77 are purged at the same time that the stack is pushed or popped to execute the call, jump, or return. By purging the instruction pipelines, program control unit 18 can also smoothly transition from 16-bit sections of the program to or from 32-bit sections of the program.

Furthermore, when an assembly language program such as that shown in FIG. 3A is assembled, CALL and JUMP instructions in the program are encoded as CALL16 or CALL32 instructions and JUMP16 or JUMP32 instructions, where CALL16 and JUMP16 instructions indicate that the location to which the CALL or JUMP leads is a 16-bit program section, whereas a JUMP32 or CALL32 instruction indicates that the program section to which the CALL or JUMP leads is a 32-bit program section. An assembler for assembling the program such as that shown in FIG. 3A is responsible for identifying the mode of instructions to which each CALL leads or each JUMP leads, in order to appropriately encode a CALL32 or CALL16, JUMP32 or JUMP16 instruction.

Figure 3B:
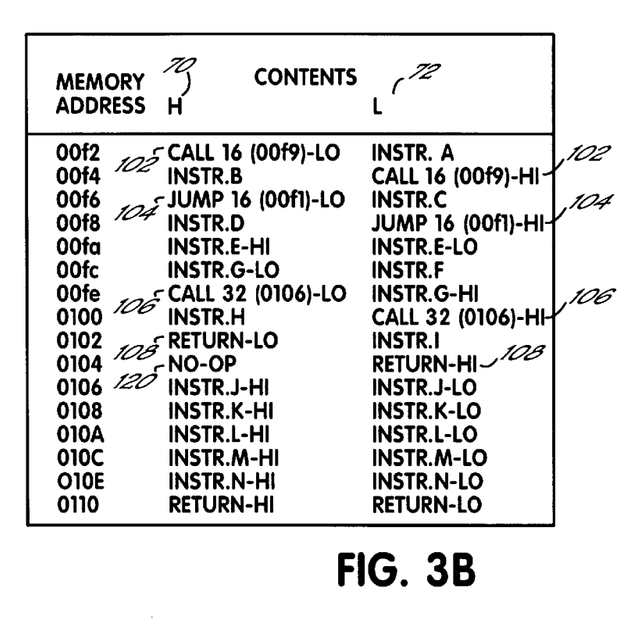
FIG. 3B illustrates the content of a program memory generated by assembling the program illustrated in FIG. 3A.

Referring now to FIG. 3B, details of an assembled machine language program can be appreciated. The assembled machine language program illustrated in FIG. 3B is the result of assembling and linking the assembly language program shown in FIG. 3A. Assuming that 16-bit instruction A which corresponds to label 0 is stored in memory address 00f2 hexadecimal, it can be seen that CALL instruction 102, instruction B, instruction C, and JUMP instruction 104 are sequentially stored in 16-bit sections of program memory 16 divided between segments 70 and 72 of the memory. CALL instruction 102 and JUMP instruction 104 are 32-bit instructions stored in two sequential locations in segments 70 and 72. Instructions B and C are 16-bit instructions stored in segment 70 and 72, respectively. Accordingly, during execution, instructions are loaded 16-bits at a time in an alternating fashion from segments 70 and 72 through multiplexer 84 as discussed above with reference to FIG. 2.

It will be noted that all CALL and JUMP instructions in the assembled machine language program are 32-bits wide. Furthermore, it will be noted that CALL16/JUMP16 or CALL32/JUMP32 instructions are used, as appropriate, to identify the kinds of instructions in the section to which the CALL or JUMP instruction leads. Specifically, CALL instruction 102, because it leads a 16-bit section of the program, is encoded as a 32-bit CALL16 instruction, and JUMP instruction 104 is encoded as a 32-bit JUMP16 instruction for similar reasons. The CALL and JUMP instructions include an identification of the memory address to which the program execution should jump or call; the specific address is determined by the assembler upon assembly of the original program by a process discussed below with reference to FIG. 4.

The code section beginning at label 1 in FIG. 3A begins at memory address 00f9 hexadecimal in FIG. 3B. As can be seen, this code section includes instructions D, E, F and G, CALL instruction 106, instructions H and I and RETURN instruction 108. Each of instructions D, F, H and I (i.e., all instructions other than instruction E, G, and the CALL and RETURN instructions) is 16-bits wide and positioned in alternating memory segments 70 and 72 so that the instructions can be read by multiplexer 84 from the alternating memory segments as discussed above with reference to FIG. 2. Instruction E and the CALL and RETURN instructions are 32-bit instructions, and are stored in two consecutive locations spanning segments 70 and 72.

As can be seen at 120 in FIG. 3B, the second 16-bit section of the program ends at an odd numbered instruction location (address 105). In a 32-bit section of the program, 32-bit instructions such as instructions J, K, L, M and N must be fetched from two contiguous locations in segments 70 and 72 of program memory 16. Accordingly, a no-operation (NO OP) instruction is inserted at 120 (address 105) so that program execution for the subsequent 32-bit section begins at an even numbered memory location.

The 32-bit section of the program illustrated in FIG. 3A begins at memory address 0106 in FIG. 3B. Because this section of the program is a 32-bit section, all of the instructions consume 32-bits including 16-bits in the lower memory segment 72 and 16-bits in the upper memory segments 70. Instructions J, K, L, M and N and return instruction 112 are included in this section. Note that instructions M and N are 16-bit instructions which would occupy only one 16-bit word if used in a 16-bit section of the program; however, in a 32-bit section of the program, these instructions are assembled to consume 32 bits.

Referring to FIGS. 4A–4C, the format of files storing the three sections of the program of FIG. 3A can be discussed. The assembler syntax requires that each file storing a program section must begin with a PSECT16 code line 100 or PSECT32 code line 98, indicating whether the following program section is to be assembled for use in 16-bit mode or in 32-bit mode. The PSECT code line further includes a section identifier to be used in subsequent references to the section. In the illustrated examples, these section identifiers are "section 1", "section 2" and "section 3", but might be any other identifier, for example, the identifiers might relate to the functions performed by the code section.

Figure 5A:
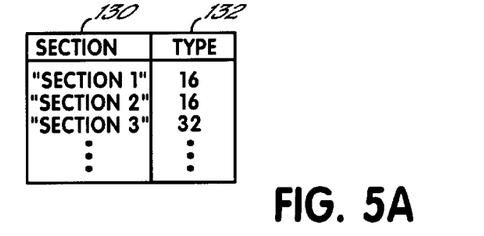
FIG. 5A is an illustration of a table generated during assembly of the program of FIG. 3A, identifying the types of the sections shown in FIGS. 4A–4C.

One important function of the assembler and linker described below is to determine the types of each section of the program, so that 16-bit sections are compiled for retrieval in 16-bit mode, 32-bit sections are compiled for retrieval in 32-bit mode, and so that CALL and JUMP instructions appropriately set the mode of the processor as part of the CALL or JUMP. To serve this purpose, a table such as that shown in FIG. 5A is constructed during an initial scan of the sections of the program prior to operation of the assembler. This table has a column 130 into which the section identifier of each section is placed, and a column 132 into which the type of the section, 16 or 32 bit, is placed. As described below, this table is referenced when assembling and linking sections to ensure that sections are appropriately assembled into an executable program.

Note that the CALL and JUMP code lines in a section may reference a label defined within that section, e.g., the JUMP code line in section 1 of FIG. 4A references label 0, which is defined in section 1 of FIG. 4A. Alternatively, a CALL or JUMP code line in a section may reference a label defined in another section, e.g., the CALL code line in section 1 of FIG. 4A references label 1, which is defined in section 2 of FIG. 4B.

Figure 5B:
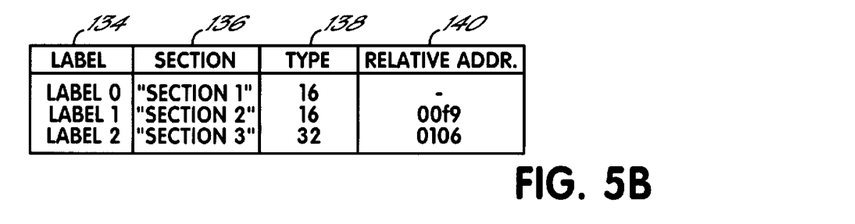
FIG. 5B is an illustration of a table generated during assembly of the program of FIG. 3A, identifying the locations of labels within the sections shown in FIGS. 4A–4C.

Another important part of the operations of the assembler and linker is to identify the location of labels in sections, so that the appropriate address of the label can be substituted when the executable program is linked. As part of this operation, a table such as that illustrated in FIG. 5B is generated. The label identifiers are placed into a first column 134 of this table. A second column 136 stores the section identifier for the section including the label. A third column 138 stores the type of the section, i.e., 16 or 32 bit. A fourth column 140 stores the relative address of the location of the label. The collection and use of this data is discussed immediately below.

Figure 6A:
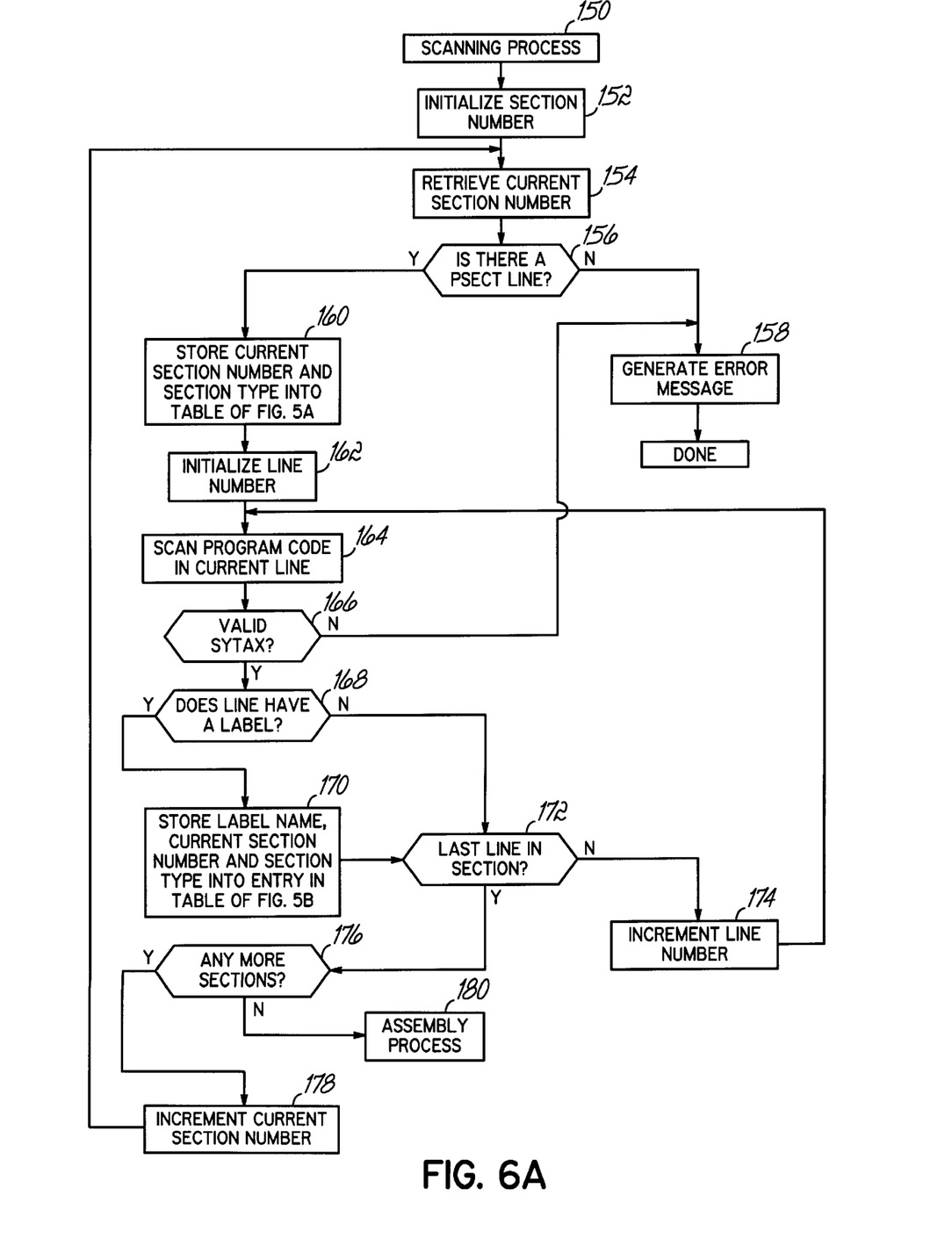
FIGS. 6A, 6B and 6C are flow charts illustrating the operations of an assembler and linker for generating programs having 16- and 32-bit instructions of the kind illustrated in FIG. 3B, from assembly code of the kind illustrated in FIG. 3A, performing scanning, assembling and linking operations.
Figure 6B:
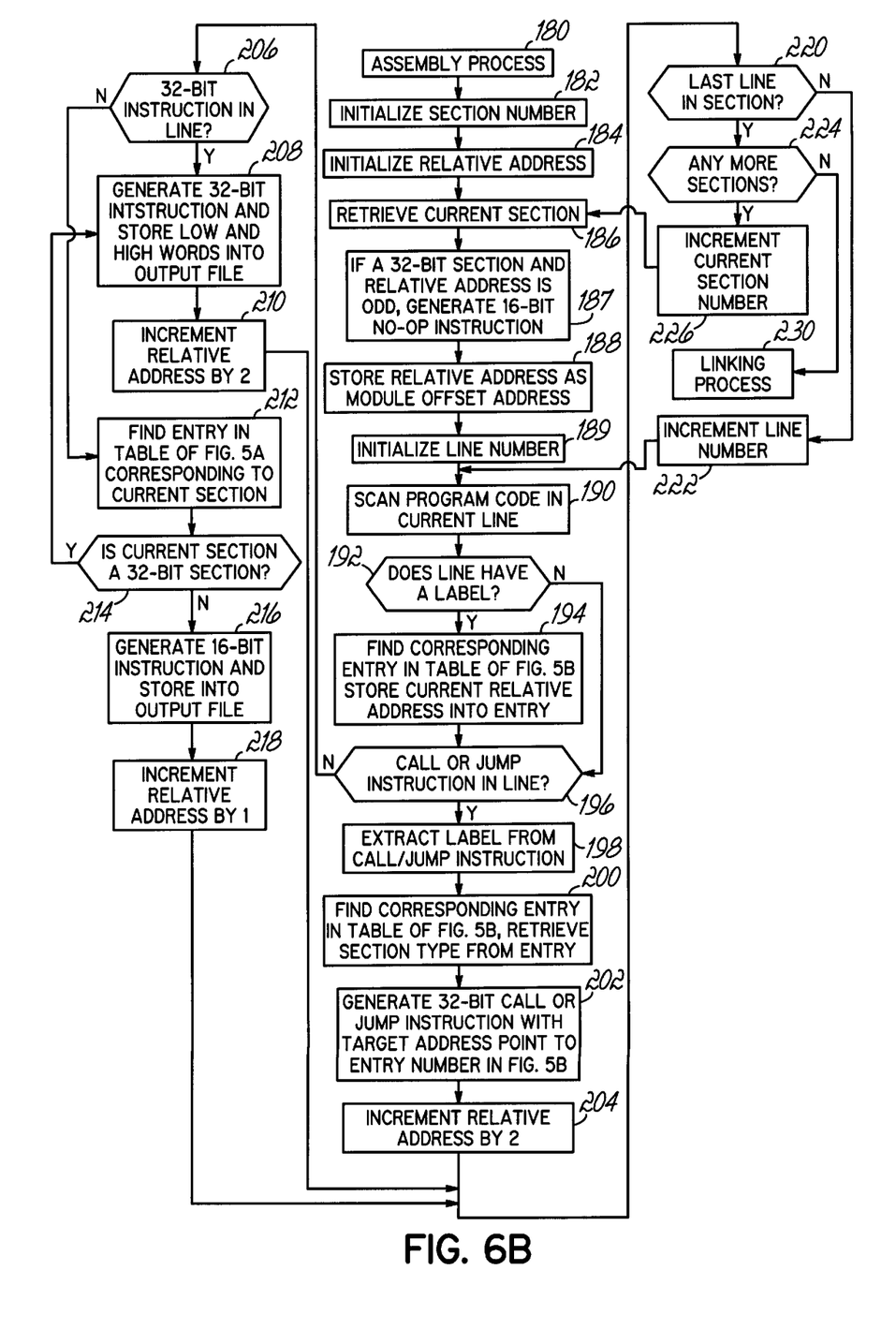
Figure 6C:
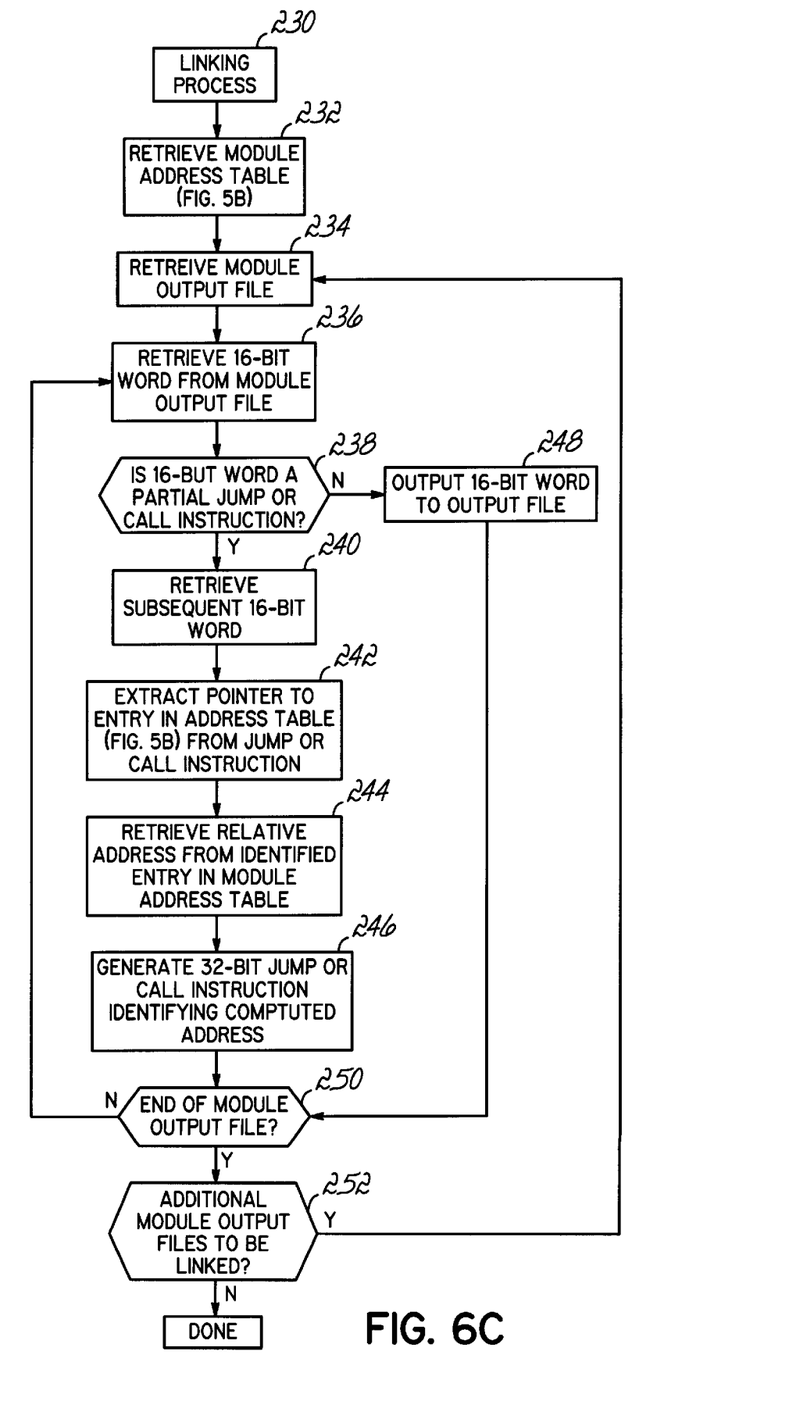

Referring now to FIGS. 6A–6C, the detailed operation of an assembler and linker for assembling and linking an assembly language program such as that shown in FIG. 3A can be understood.

Prior to assembly, the assembly language program is scanned in a scanning process 150 illustrated in FIG. 6A, to generate tables such as those discussed above with reference to FIGS. 5A and 5B. The scanning process 150 begins at a step 152 by initializing the section number to the first section to be scanned. Then, the code lines for the current section are retrieved in step 154, and the first line of the section is evaluated in step 156 to determine whether there is a PSECT code line. As noted above, the syntax of the assembly language requires that each section begin with a PSECT line. Accordingly, if there is no PSECT line in step 156, then in step 158 an error message is generated and the scanning process (and the assembly and linking process) are done.

If there is a PSECT line, then in step 160 a line is added to the table illustrated in FIG. 6A, to store the current section identifier and the section type (16 or 32-bit), as identified by the PSECT line. Then, in step 162, the current code line is initialized to the first line in the program following the PSECT line, to prepare for a loop of steps which scan each program line in the section.

In step 164, a code line is scanned. In step 166, the syntax of the line is checked to determine whether the line is properly encoded in accordance with the assembly language. If not, then an error message is generated in step 158, and the scanning, assembling and linking process is done.

If a line has a proper syntax, then in step 168, the line is evaluated to determine whether the line has a label associated with it. If so, then in step 170, an entry is added to the table of FIG. 5B to store information regarding the label. Specifically, the label name, the current section identifier, and the type of the section (16- or 32-bit) are stored into a new entry in the table of FIG. 5B.

After step 170, or immediately after step 168 if the current code line does not have a label, in step 172 it is determined whether the current code line is the last code line in the current section. If not, the current line number is incremented in step 174 and processing returns to step 164. If the current code lines is the last code line in the current section, then in step 176 it is determined whether there are any more sections. If so, in step 178 the current section number is incremented and processing returns to step 154. If all sections have been processed, then execution proceeds to the assembly process 180 illustrated in FIG. 6B.

In the assembly process 180, each section of code lines is converted into a module of executable instructions, to be subsequently linked together with other modules to form a complete program such as that illustrated in FIG. 3B. The assembly process proceeds by scanning each code line in each section, and converting the code line into an executable instruction.

To begin the assembly process, the current section number is initialized in step 182. Further, in step 184 the current relative address of instructions produced from the current section number is initialized. This relative address reflects the location, relative to the beginning of the current module, of instructions being output into the module.

After this initialization, in step 186, the current section of code lines is retrieved for assembly. In step 187, it is determined whether the current section is a 32-bit section, and whether the current relative address has an odd value. If both conditions are true, then a 16-bit NO-OP instruction is output at the beginning of the module, to align the subsequent 32-bit instructions into the low and high segments 72 and 70 of program memory, 16. Then, in step 188, the line number in the current section is initialized to the first code line after the PSECT code line. Then, in step 190, the program code in the current code line is scanned. In step 192, it is determined whether the code line has a label associated with it.

If the current code line has a label associated with it, then the current relative address, which will be the relative address of the instruction which will result from the current code line, is stored into the table of FIG. 5B, for later use in locating the current code line. Specifically, in step 194, the entry in the table of FIG. 5B corresponding to the defined label is located. Then, the current relative address of the current code line is stored into this entry. (Subsequently, in the linking process of FIG. 5C, this relative address is used in generating CALL or JUMP instructions referencing the label in the current line.)

After step 194, or immediately after step 192 if the current code line does not have a label, in step 196 the current code line is evaluated to determine whether it is a flow control code line such as JUMP, or CALL. If so, then the code line will include a reference to a label. In this case, in step 198, the referenced label is extracted from the CALL or JUMP instruction. Then in step 200, the entry in the table of FIG. 5B corresponding to the referenced label is located, and the section type (16- or 32-bit) of the section in which the label is defined is retrieved from column 138 of this entry. Then, in step 202, a 32-bit JUMP or CALL instruction is generated and stored into the output module for the current section. If the section type of the section in which the label is defined is a 16 section, then a JUMP16 or CALL16 instruction is generated. If the section type of the section in which the label is defined is a 32 bit section, then a JUMP32 or CALL32 instruction is generated. Finally, in step 204, the relative address is incremented by two to reflect that two 16-bit words for the JUMP or CALL instruction have been added to the output module.

Returning to step 196, if the current code line does not include a CALL or JUMP instruction, then the assembly process proceeds to step 206, in which it is determined whether the current code line refers to a 32-bit instruction. Some instructions, for example those instructions which involve relatively complex operations, must be encoded as 32-bit instructions, even in 16-bit sections of code. Examples in FIG. 3A include instructions E and G. When a 32-bit instruction of this kind appears in a code line, then the assembly process proceeds from step 206 to step 208 in which the two 16-bit words comprising the 32-bit instruction are generated and stored into the output module. Then, in step 210, the relative address is incremented by two to reflect that two 16-bit words for the 32-bit instruction have been added to the output module.

Returning to step 206, if the current instruction is not a 32-bit instruction, then in step 212 the assembly process references the table of FIG. 5A, to locate the entry corresponding to the current section. In step 214, the section type identified in column 132 of this entry is evaluated to determine whether the current section is a 32-bit section. If so, then all instructions generated for the output module for the current section should be generated as 32-bit instructions. In this case, processing proceeds from step 214 to step 208, to generate the 32-bit instruction. Alternatively, if in step 214, the current section is not a 32-bit section, then the assembly process proceeds to step 216 to generate a 16-bit instruction for the current code line and store the single 16-bit word for this instruction into the output module for the current section. Thereafter, in step 218 the relative address is incremented by one to reflect the insertion of an additional 16-bit word into the output module.

After step 204, 210 or 218, when a 16- or 32- bit instruction for the current code line has been added to the output module, in step 220 the assembly process determines whether the last code line in the current section has been processed. If not, in step 222 the code line number is incremented and processing returns to step 190 to analyze the next code line. If the last code line has been reached, then in step 224 the assembly process determines whether there are any more sections to be assembled. If so, then in step 226, the current section number is incremented, and processing returns to step 186 to process the next section. If all sections have been analyzed, then processing proceeds to the linking process 230 illustrated in FIG. 6C.

In the linking process 230, the modules produced in the assembly process are scanned and finalized, and linked together into a single executable program. Thus, the linking process 230 involves a third scan through the modules produced in the assembly process, determining absolute addresses for each of the labels identified during the scanning and assembly processes. In step 232, the module address table shown in FIG. 5B is retrieved for use in linking modules. Then, in step 234, a module output file is retrieved.

Each 16-bit word in a module output file is analyzed to determine whether a linking address is needed. Thus, in step 236, a 16-bit word is retrieved from the current module output file, and in step 238, the 16-bit word is analyzed to determine whether the 16-bit word is a partial CALL or JUMP instruction. As noted above, when a CALL or JUMP instruction is assembled, it is assembled in partial form, with a pointer to the entry for the referenced label in the table of FIG. 5B. Also, it will be noted that CALL or JUMP instructions are 32-bit instructions spanning two 16-bit words in a module output file. Thus, if the 16-bit word retrieved from the module output file is one-half of a partial JUMP or CALL instruction, in step 240 the subsequent 16-bit word from the module output file is retrieved. Then, in step 242, the pointer in the partial JUMP or CALL instruction is retrieved, and in step 244, this pointer is used to retrieve an entry from the table of FIG. 5B, and extract the relative address from that entry. With this relative address, then, a 32-bit complete JUMP or CALL instruction is generated in step 246 and output into the final executable file. If the 16-bit word analyzed in step 238 is not a partial JUMP or CALL instruction, then in step 248 the 16-bit word is directly output to into the final executable file.

After step 246 or step 248, in step 250 the linking process determines whether the end of the module output file has been reached. If not, the linking process returns to step 236 to analyze the next 16-bit word in the module output file. If, however, the end of the module output file has been reached, then in step 252, the linking process determines whether there are additional module output files to be linked. If so, processing returns to step 234 to retrieve the additional module output file. If, however, all module output files have been linked, then the linking process is done, and a complete executable file has been created.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A digital signal processor, comprising:

a program memory storing instructions comprising a program for said digital signal processor, said instructions including short instructions having a first number of digital signals and long instructions having a second number of digital signals greater than said first number of digital signals of said short instructions, wherein said program memory comprises a first section and a second section, said long instructions being stored in said first section and said second section, each said short instruction being stored in a single entry of said first or second sections;

a program control unit retrieving instructions from said program memory, and responding to said instructions by generating command signals controlling operations of other units of said digital signal processor, said program control unit having a first mode in which said program control unit retrieves and responds to said short instructions and retrieves and responds to long instruction from either said first or said second sections of said program memory, and a second mode in which said program control unit retrieves and responds only to long instructions from both said first and said second sections of said program memory;

a register file storing digital data;

an address generator unit connected to a digital data bus, said register file and to said program control unit and responding to command signals to retrieve and store data from and to a digital data memory to and from said register file via said digital data bus; and at least one logic unit connected to said program control unit and to said register file and responding to command signals to perform digital data processing upon data in said register file.

2. The digital signal processor of claim 1, wherein said program control unit further comprises a multiplexer having a first input connected to said first section of said program memory, and a second input connected to said second section of said program memory, and an output, said multiplexer delivering short instructions from either said first or said second section of said program memory when said program control unit is in said first mode.

3. The digital signal processor of claim 1, wherein said program control unit retrieves sequential instructions from said program memory until encountering a flow control instruction, said program control unit responding to a flow control instruction by accessing a subsequent instruction at a location in said program memory identified by said flow control instruction, said program control unit being responsive to an indication in a flow control instruction of a processor mode to be used upon access of said subsequent instruction, by placing said program control unit into said first or said second modes in accordance with a mode identified by said flow control instruction.

4. The digital signal processor of claim 3, wherein said program control unit comprises pipelines of instructions to be responded to, said program control unit responding to a flow control instruction by emptying said pipelines of instructions.

5. The digital signal processor of claim 3, wherein said program control unit further comprises a stack memory, said program control unit is further responsive to a CALL flow control instruction by storing in said stack memory a location in said program memory subsequent to said CALL flow control instruction, and storing in said stack memory an indication of whether said program control unit was in said first or second mode prior to execution of said CALL flow control instruction, and said program control unit is further responsive to a RETURN flow control instruction by retrieving from said stack memory a previously stored location in program memory and a previously stored processor mode, placing said program control unit into said first or said second modes in accordance with said previously stored processor mode, and then accessing an instruction at said previously stored location.

6. A method of operating a digital signal processor having a digital data bus, a register file connected to said digital data bus and storing digital data, an address generator connected to said register file and responding to command signals to address digital data in said register file, and a logic unit connected to said register file and responding to command signals to perform digital data processing upon data in said register file, the method comprising:

storing in a program memory instructions comprising a program for said digital signal processor, said instructions including short instructions having a first number of digital signals and long instructions having a second number of digital signals greater than said first number of digital signals of said short instructions, wherein said program memory comprises a first section and a second section, said long instructions being stored in said first section and said second section, each said short instruction being stored in a single entry of said first or second sections;

retrieving said instructions, responding to said instructions by generating command signals to said address generator to retrieve and store data to and from said register file via said digital data bus, or by generating command signals to said logic unit to perform digital data processing upon data in said register file, said responding step including responding to short and long instructions from either said first or said second sections of a program memory in a first mode, and responding only to long instructions from both said first section and said second sections of said program memory in a second mode.

7. The method of claim 6, wherein said instructions are stored in a program memory comprising a first section and a second section, said long instructions being stored in two entries from said first and second sections, each said short instruction being stored in a single entry of said first or second sections.

8. The method of claim 7, wherein said digital signal processor further comprises a multiplexer responsive to control signals and having a first input connected to said first section of said program memory, and a second input connected to said second section of said program memory, and an output, retrieving a short instruction comprises delivering a short instruction from either said first or said second section of said memory through said multiplexer, and retrieving a long instruction comprises delivering the long instruction from both said first and second sections through said multiplexer.

9. The method of claim 6, wherein retrieving instructions comprises retrieving sequential stored instructions until a flow control instruction is encountered, and then responding to the flow control instruction by retrieving a subsequent instruction from a location identified by the flow control instruction.

10. The method of claim 9, wherein responding to a flow control instruction further comprises responding to an indication in a flow control instruction of a mode to be used upon access of said subsequent instruction, and in a first mode, retrieving the subsequent instruction comprises retrieving a short instruction from either said first or said second section of said memory through said multiplexer, or in a second mode, retrieving the subsequent instruction comprises retrieving a long instruction from both said first and second sections through said multiplexer.

11. The method of claim 9, wherein said digital signal processor comprises pipelines of instructions which have been retrieved and are to be responded to, and responding to a flow control instruction further comprises emptying said pipelines of instructions.

12. The method of claim 10, wherein said digital signal processor comprises a stack memory, and responding to a CALL flow control instruction further comprises storing in said stack memory a location of an instruction subsequent to said CALL flow control instruction and storing in said stack memory an indication of whether instructions were being retrieved in said first or second mode prior to responding to said CALL flow control instruction, and responding to a RETURN flow control instruction further comprises retrieving from said stack memory a previously stored instruction location and mode, and retrieving a subsequent instruction at the previously identified location in accordance with the previously stored mode.

13. A method of assembling a source program of code lines into an object program of instructions for use in operating a digital signal processor, the method comprising:

grouping said code lines of said source program into at least a first group and a second group, assembling a first module of short instructions of said program by scanning each code line in said first group and generating from said code lines in said first group short or long instructions of said first module, said short instructions having a first number of digital signals and said long instructions having a second number of digital signals greater than said first number of digital signals of said short instructions, said short and long instructions being mixed in said first assembled module, assembling a second module of long instructions of said program by scanning each code line in said second group and generating therefrom long instructions of said second module, linking said first and second modules of instructions together into said object program, said linking comprising determining whether said second module instructions will be aligned with a program memory storing said object program, and if not, inserting instructions between said first and second modules to align instructions of said second module with said program memory.

14. The method of claim 13 wherein said second number of digital signals is twice said first number of digital signals.

15. The method of claim 13 wherein assembling said first module of short instructions comprises scanning said first group of code lines to locate a code line indicating that said first group is to be assembled into short instructions.

16. The method of claim 13 wherein assembling said second module of long instructions comprises scanning said second group of code lines to locate a code line indicating that said second group is to be assembled into long instructions.

17. The method of claim 13 wherein said code lines include flow control code lines.

18. The method of claim 17 wherein said flow control code lines include CALL, JUMP and RETURN flow control code lines.

19. The method of claim 13 wherein assembling a group of code lines into a module of instructions comprises identifying code lines in said group defining code line labels, and for each such code line, storing in an entry of a memory at least the label and relative location within the module of the instruction derived from the code line defining the label.

20. The method of claim 19 wherein assembling a group of code lines into a module of instructions comprises identifying flow control code lines in said group which divert program flow to a referenced label, and for each such flow control code line generating a partial flow control instruction having digital signals including a pointer to an entry of the memory for the label referenced by the flow control code line.

21. The method of claim 20 wherein assembling a flow control code line further comprises determining whether a referenced label is defined in said first group of code lines which generate short instructions or in said second group of code lines which generate long instructions, and generating a partial flow control instruction identifying whether the referenced label is in code lines generating long instructions or short instructions.

22. The method of claim 20 wherein linking modules of instructions together comprises scanning each instruction in said modules to locate partial flow control instructions, and for each such partial flow control instruction, following a pointer in said partial flow control instruction to an entry in memory indicating a target address for the partial flow control instruction, and storing said target address in a complete flow control instruction in said object program.

23. A digital signal processor, comprising a program memory having a plurality of rows storing instructions comprising a program for said digital signal processor, said instructions including short instructions having a first number of digital signals and long instructions having a second number of digital signals greater than said first number of digital signals of said short instructions;

a program control unit retrieving instructions from said program memory, and responding to said instructions by generating command signals controlling operations of other units of said digital signal processor, said program control unit having a first mode in which said program control unit retrieves and responds to short instructions, and a second mode in which said program control unit retrieves and responds to long instructions, said program control unit retrieving said long instructions in said second mode from positions in predetermined alignment with rows of said program memory, said program control unit retrieving one or more instructions in said first mode from positions that are misaligned with rows of said digital memory, a register file storing digital data;

an address generator unit connected to said digital data bus, said register file and to said program control unit and responding to command signals to retrieve and store data from and to said digital data memory to and from said register file via said digital data bus; and at least one logic unit connected to said program control unit and to said register file and responding to command signals to perform digital data processing upon data in said register file.

24. The digital signal processor of claim 23, wherein said program memory comprises a first section and a second section, said long instructions being stored in two entries from said first section and said second section, each said short instruction being stored in a single entry of said first or second sections.

25. The digital signal processor of claim 24, wherein said program control unit further comprises a multiplexer having a first input connected to said first section of said program memory, and a second input connected to said second section of said program memory, and an output, said multiplexer delivering short instructions from either said first or said second section of said program memory when said program control unit is in said first mode.

26. The digital signal processor of claim 23, wherein
said program control unit retrieves sequential instructions from said program memory until encountering a flow control instruction, said program control unit responding to a flow control instruction by accessing a subsequent instruction at a location in said program memory identified by said flow control instruction,
said program control unit being responsive to an indication in a flow control instruction of a processor mode to be used upon access of said subsequent instruction, by placing said program control unit into said first or said second modes in accordance with a mode identified by said flow control instruction.

27. The digital signal processor of claim 26, wherein said program control unit comprises pipelines of instructions to be responded to, said program control unit responding to a flow control instruction by emptying said pipelines of instructions.

28. The digital signal processor of claim 26, wherein
said program control unit further comprises a stack memory,
said program control unit is further responsive to a CALL flow control instruction by storing in said stack memory a location in said program memory subsequent to said CALL flow control instruction, and storing in said stack memory an indication of whether said program control unit was in said first or second mode prior to execution of said CALL flow control instruction, and
said program control unit is further responsive to a RETURN flow control instruction by retrieving from said stack memory a previously stored location in program memory and processor mode, placing said program control unit into said first or said second modes in accordance with said stored processor mode, and then accessing an instruction at said previously stored location.

29. A method of operating a digital signal processor having a digital data bus, a register file connected to said digital data bus and storing digital data, an address generator connected to said register file and responding to command signals to address digital data in said register file, and a logic unit connected to said register file and responding to command signals to perform digital data processing upon data in said register file, the method comprising
storing instructions comprising a program for said digital signal processor into rows of a memory, said instructions including short instructions having a first number of digital signals and long instructions having a second number of digital signals greater than said first number, said program including a first group of instructions comprising long instructions in predetermined alignment with rows of said memory, and including a second group of instructions at least some of which are misaligned with rows of said memory;
retrieving said instructions,
responding to said instructions by generating command signals to said address generator to retrieve and store data to and from said register file via said digital data bus, or by generating command signals to said logic unit to perform digital data processing upon data in said register file.

30. The method of claim 29, wherein said instructions are stored in a program memory comprising a first section and a second section, said long instructions being stored in two entries from said first and second sections, each said short instruction being stored in a single entry of said first or second sections.

31. The method of claim 30, wherein
said digital signal processor further comprises a multiplexer responsive to control signals and having a first input connected to said first section of said program memory, and a second input connected to said second section of said program memory, and an output,
retrieving a short instruction comprises delivering a short instruction from either said first or said second section of said memory through said multiplexer, and
retrieving a long instruction comprises delivering the long instruction from both said first and second sections through said multiplexer.

32. The method of claim 29, wherein
retrieving instructions comprises retrieving sequential stored instructions until a flow control instruction is encountered, and then responding to the flow control instruction by retrieving a subsequent instruction from a location identified by the flow control instruction.

33. The method of claim 32, wherein
responding to a flow control instruction further comprises responding to an indication in a flow control instruction of a mode to be used upon access of said subsequent instruction, and
in a first mode, retrieving the subsequent instruction comprises retrieving a short instruction from either said first or said second section of said memory through said multiplexer, or
in a second mode, retrieving the subsequent instruction comprises retrieving a long instruction from both said first and second sections through said multiplexer.

34. The method of claim 32, wherein said digital signal processor comprises pipelines of instructions which have been retrieved and are to be responded to, and
responding to a flow control instruction further comprises emptying said pipelines of instructions.

35. The method of claim 33, wherein said digital signal processor comprises a stack memory, and
responding to a CALL flow control instruction further comprises storing in said stack memory a location of an instruction subsequent to said CALL flow control instruction, and storing in said stack memory an indication of whether instructions were being retrieved in said first or second mode prior to responding to said CALL flow control instruction, and
responding to a RETURN flow control instruction further comprises retrieving from said stack memory a previously stored instruction location and mode, and retrieving a subsequent instruction at the previously identified location in accordance with the previously stored mode.

* * * * *